United States Patent [19]
Ohsawa

[11] Patent Number: 5,612,762
[45] Date of Patent: Mar. 18, 1997

[54] FOCUS DETECTION DEVICE FOR A CAMERA

[75] Inventor: Keiji Ohsawa, Yokohama, Japan

[73] Assignee: Nikon Corporation, Tokyo, Japan

[21] Appl. No.: 540,562

[22] Filed: Oct. 6, 1995

Related U.S. Application Data

[63] Continuation of Ser. No. 339,282, Nov. 7, 1994, abandoned, which is a continuation of Ser. No. 955,254, Oct. 1, 1992, abandoned.

[30] Foreign Application Priority Data

Oct. 9, 1991 [JP] Japan ................................. 3-262329

[51] Int. Cl.$^6$ ................................................. G03B 13/36
[52] U.S. Cl. ................................... 396/114; 396/121
[58] Field of Search .................................. 354/402, 406, 354/407, 408

[56] References Cited

U.S. PATENT DOCUMENTS

| | | | |
|---|---|---|---|
| 4,768,052 | 8/1988 | Hamada et al. | 354/406 X |
| 4,954,701 | 9/1990 | Suzuki et al. | 354/406 X |
| 4,978,988 | 12/1990 | Karasaki | 354/406 |
| 4,992,819 | 2/1991 | Ohtaka et al. | 354/408 |
| 5,068,217 | 2/1992 | Ishida et al. | 354/408 X |
| 5,138,359 | 8/1992 | Nagano et al. | 354/406 |

FOREIGN PATENT DOCUMENTS 2-50115  2/1990  Japan.

*Primary Examiner*—Russell E. Adams
*Attorney, Agent, or Firm*—Staas & Halsey

[57] ABSTRACT

A focus detection device for a camera capable of detecting focuses at a plurality of areas on a photographing field, comprises two pairs of photo-electric conversion device arrays arranged on one substrate in optical correspondence to two of said plurality of areas; the two areas being arranged on a line extending generally vertically to a horizontal center axis crossing an optical line on the photographing field, on the opposite sides of the center line; and a refocusing optical system for refocusing light beams passing through different points of an exit pupil of a photographing lens, onto the two pairs of photo-electric conversion device arrays; the refocusing optical system including a pair of refocusing lenses for focusing the light beams onto the two pairs of photo-electric conversion device arrays.

13 Claims, 5 Drawing Sheets

FOCUS DETECTION DEVICE FOR A CAMERA

This application is a continuation of application Ser. No. 08/339,282, filed Nov. 7, 1994, now abandoned, which is a continuation of Ser. No. 07/955,254, filed Oct. 1, 1992, now abandoned.

BACKGROUND OF THE INVENTION

1. Field of the Invention

The present invention relates to a focus detection device for a camera such as a single-lens reflex type camera or a video camera.

2. Related Background Art

A so-called differential phase type focus detection device for focusing a lens in accordance with a light distribution pattern of an image created by sensing light beams passing through different points on an exit pupil plane of a photographing lens by a photo-electric conversion device array such as a CCD has been widely used in a camera.

Since such a photo-electric conversion device array is usually arranged in a predetermined direction, for example, a horizontal direction which contains an optical axis at a center of a photographing field, it is difficult to detect a focus point of an object extending parallel to the photo-electric conversion device array, for example, a horizontal line. Further, such a device can detect the focus point only in the vicinity of the center of the photographing field.

To solve those problems, Japanese Laid-Open Patent Application No. 2-50115 proposes the following focus detection device. Namely, a plurality of photo-electric conversion device arrays are arranged. FIGS. 6A and 6B show focus detection areas on the photographing field. FIG. 5 shows a configuration of an optical system corresponding to FIG. 6A. Light beams transmitted through a photographing lens 211 are defined by a view field mask 222 having rectangular apertures 222a–222c for defining the view field, pass through condenser lenses 221a–221c, and are projected to CCD photo-electric conversion device arrays 216a–216c on a substrate 217 by an iris mask 219 and pairs of separator lenses 218. A configuration of an optical system for FIG. 6B is not shown but it is seen from FIG. 5 and other embodiments that refocusing optical systems for focus detection areas $2a_2$–$2e_2$ are required.

In the device disclosed in Japanese Laid-Open Patent Application No. 2-50115, off-axis areas $2b_1$ and $2c_1$ extend horizontally of the photographing field as shown in FIG. 6A. While the areas $2b_1$ and $2c_1$ are arranged on the same line, the distance therebetween is very large. Thus, independent refocusing optical systems are required as shown by condenser lenses 221b and 221c separator lenses 218b and 218c, and irises 219b and 219c. Where the off-axis areas $2b_1$ and $2c_1$ are to be focused by one refocusing optical system, focus detection light beams must be sharply deflected and various aberrations are included in refocusing the light beams on the CCD photo-electric conversion device array. It is very difficult from an optical property standpoint to solve the above problem.

FIG. 6B shows that off-axis areas $2b_2$–$2e_2$ are arranged vertically and horizontally. Since the CCD photo-electric conversion device arrays for those areas $2b_2$–$2e_2$ are not arranged on the same line, those four areas $2b_2$–$2e_2$ require four refocusing optical systems.

In such a device, the number of parts such as lenses (condenser lenses and refocusing lenses) increases, which causes the increase of cost and the increase of adjustment time of the optical systems.

SUMMARY OF THE INVENTION

In a phase type focus detection device, a refocusing lens pair to be used for detecting a focus comprises only one pair to cover two focus detection areas on a photographing field. Accordingly, the cost is reduced and the adjustment of the optical system is simplified.

Further, since the focus detection areas contain four points which equi-divide crossing diagonal lines on the photographing field into three, a chance of in-focusing is high in photographing by a generally fundamental composition.

DETAILED DESCRIPTION OF THE PREFERRED EMBODIMENTS

Figure 1:
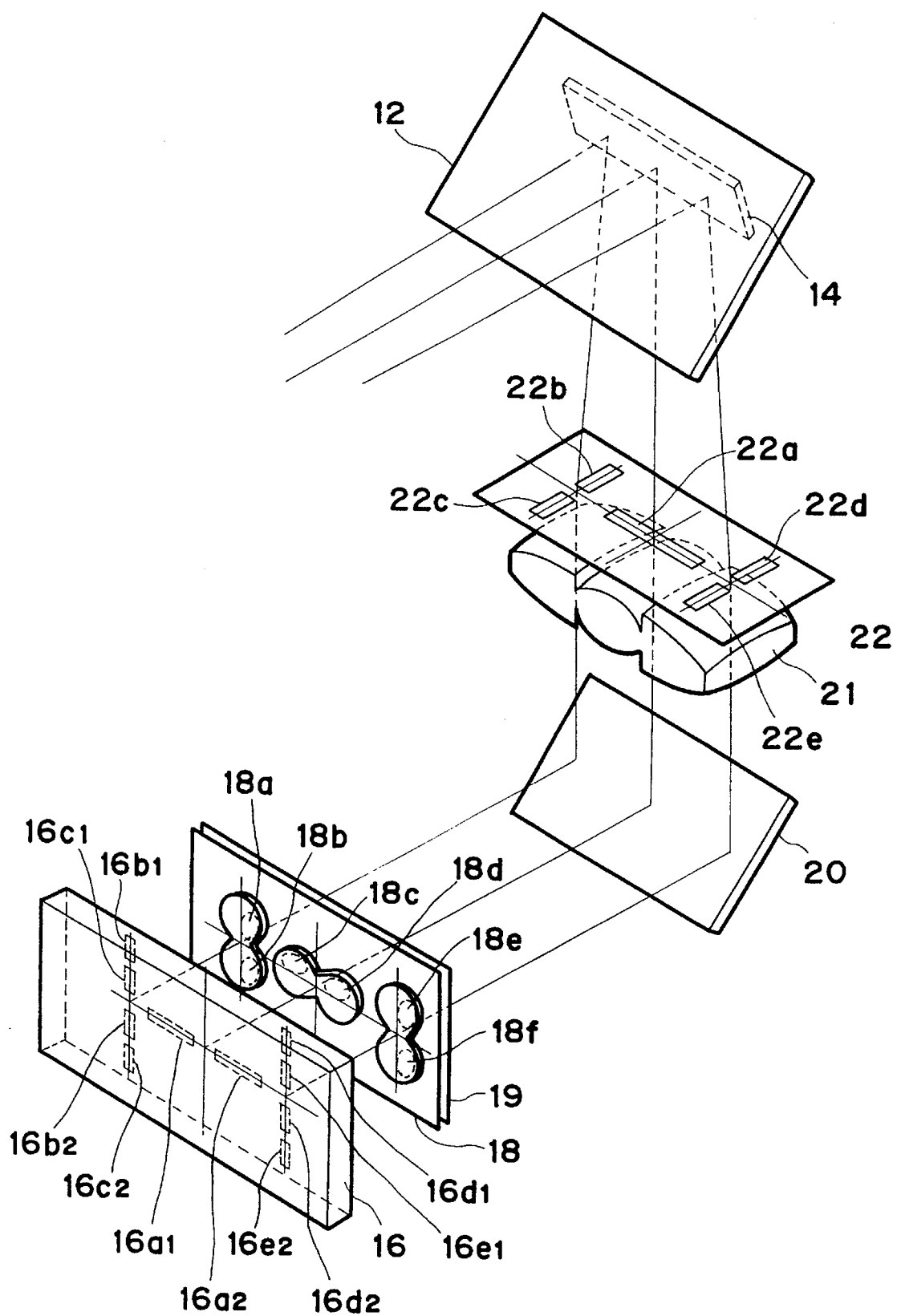
FIG. 1 shows a perspective view of a construction of a focus detection device in accordance with an embodiment of the present invention.
Figure 2:
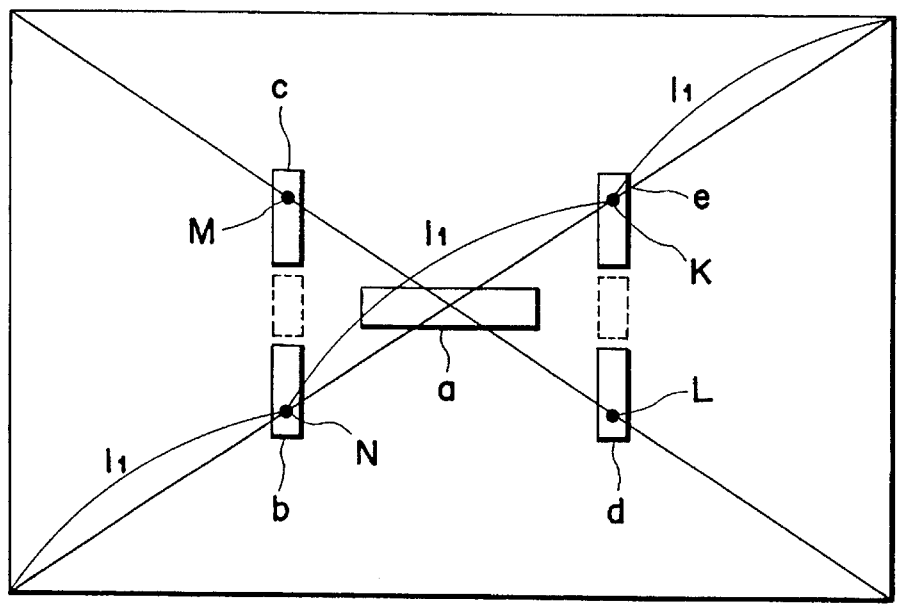
FIG. 2 shows an arrangement of focus detection areas on a photographing field.
Figure 3:
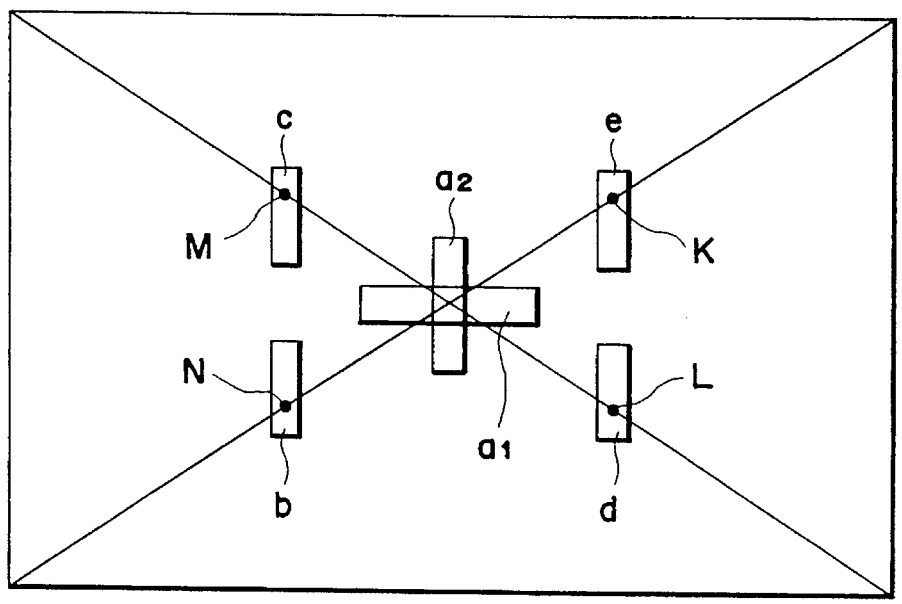
FIG. 3 shows an arrangement of focus detection areas.

FIGS. 1 to 3 show a first embodiment of the present invention. FIG. 1 shows a construction of the focus detection device of the first embodiment. FIGS. 2 and 3 show focus detection areas on a photographing field in the first embodiment. The device of FIG. 1 comprises a photographing lens (not shown), a main mirror 12, a sub-mirror 14, a view field mask 22, a condenser lens unit 21, a mirror 20, an iris mask 19, a separator lens unit 18 and CCD photo-electric conversion device arrays $16a_1$–$16e_2$ on a substrate 16. A basic light path is identical to that of the prior art device.

FIG. 2 shows focus detection areas on the photographing field when the present device is applied to a 35 mm camera. An area a is arranged horizontally to contain an optical axis, when the camera is oriented so that the length of the rectangular filed is horizontal, as shown in FIG. 2. Off-axis areas b–c, and d–e are separated by a horizontal center line (not shown) of the field, which passes through the optical axis. The focus detection is not conducted in areas shown by broken lines in FIG. 2. In normal photographing, it is assumed that it does not happen that an object is present only in the broken line areas of FIG. 2, and the focus detection may be conducted by one of upper and lower areas. Accordingly, the CCD photo-electric conversion device arrays for the broken line areas of FIG. 2 may be eliminated. In this manner, the number of pixels need not be significantly increased and the processing time can be reduced.

Light beams passing through different points of an exit pupil of the photographing lens are focused in the vicinity of the view field mask 22, pass through the condenser lens unit 21 and are separated by the separator lens unit 18, which has three pairs of lenses 18a–18f, and they are refocused onto the CCD photo-electric conversion device arrays $16a_1$–$16e_2$.

The area a in FIG. 2 corresponds to the rectangular aperture 22a of the view field mask 22 of FIG. 1. The light beam directed to the rectangular aperture 22a passes through the condenser lens unit 21, and the light beam reflected by the mirror 20 passes through the separator lenses 18c and 18d and forms images that are focused onto the CCD photo-electric conversion device arrays $16a_1$ and $16a_2$. Similarly, the area b corresponds to the rectangular aperture 22b of the view field mask 22. The light beam directed to the rectangular aperture 22b passes through the condenser lens unit 21, and the light beam reflected by the mirror 20 passes through the separator lenses 18a and 18b and forms images that are focused onto the CCD photo-electric conversion device arrays $16b_1$ and $16b_2$. The area c corresponds to the rectangular aperture 22c of the view field mask 22. The light beam directed to the rectangular aperture 22c passes through the condenser lens unit 21, and the light beam reflected by the mirror 20 passes through the separator lenses 18a and 18b and forms images that are focused onto the CCD photo-electric conversion device arrays $16c_1$ and $16c_2$. The area d corresponds to the rectangular aperture 22d of the view field mask 22. The light beam directed to the rectangular aperture 22d passes through the condenser lens unit 21 and the light beam reflected by the mirror 20 passes through the separator lenses 18e and 18f and forms images that are focused onto the CCD photo-electric conversion device arrays $16d_1$ and $16d_2$. The area e corresponds to the rectangular aperture 22e of the view field mask 22. The light beam directed to the rectangular aperture 22e passes through the condenser lens unit 21, and the light beam reflected by the mirror 20 passes through the separator lenses 18e and 18f and forms images that are focused onto the CCD photo-electric conversion device arrays $16e_1$ and $16e_2$.

Figure 7:
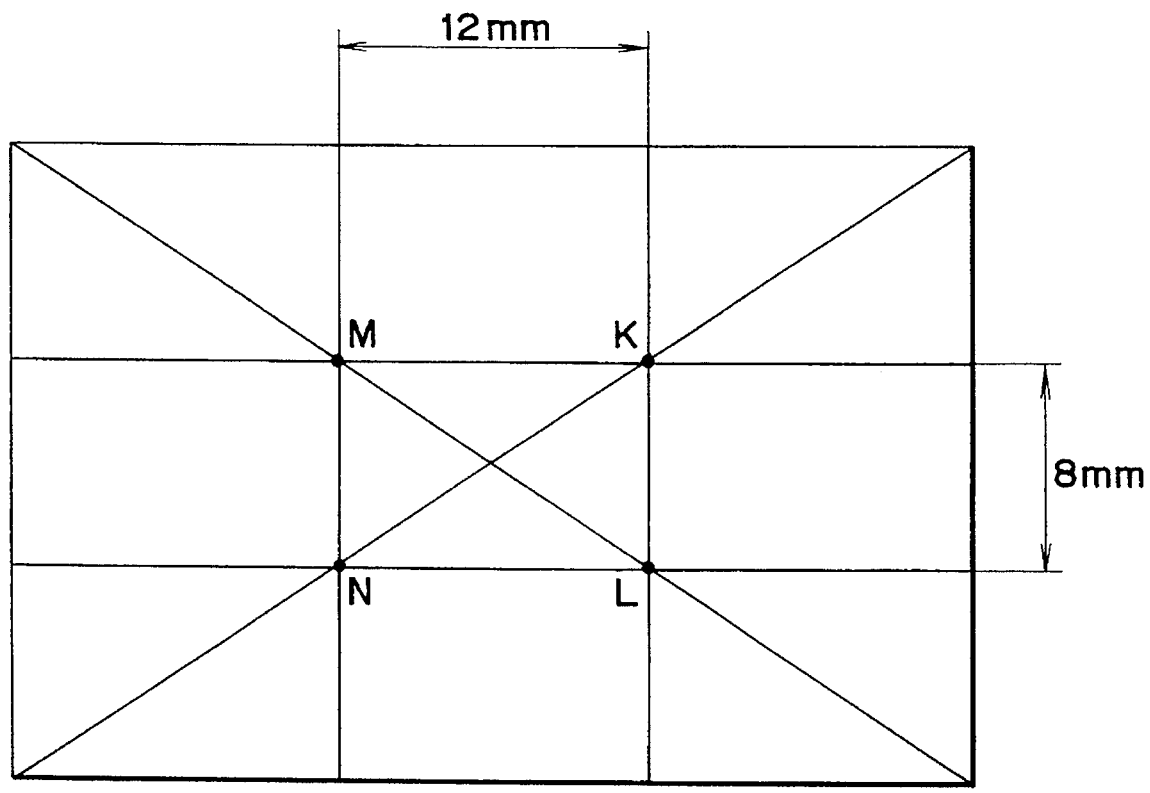
FIG. 7 shows a composition on the photographing field.

The focus detection areas appropriate for the photographing are now explained. In general, in a fundamental composition of a photograph, the object is preferably on diagonal lines of the photographing field. Particularly, four points K, L, M and N which divide the crossing diagonal lines shown in FIG. 7 into three parts are most preferable. On the photographing field of a 35 mm camera, those four points are located such that K–L is 8 mm, and M–K is 12 mm. By arranging the focus detection areas b–e of FIG. 2 at the four points K, L, M and N, photographing with a high probability of in-focus in the usual photographing is attained.

Since the off-axis focus detection areas b–e which contain the four points K, L, M and N are vertically arranged, the distances between K and L and between M and N are as short as 8 mm. As a result, the image refocused on the photo-electric conversion device arrays $16b_1$–$16e_2$ of FIG. 2 is less affected by the lens aberration, and the areas b and c and the areas d and e, which are on the common lines, require only one refocusing optical system, respectively. Accordingly, only three refocusing optical systems in FIG. 1 are required in total.

A similar effect may be attained when the off-axis areas b–e are neighboring areas which do not contain the above four points.

FIG. 3 shows an example in which a center focus detection area is cross-shaped ($a_1$, $a_2$). It allows the horizontal and vertical focus detections in the center area which contains the optical axis. This is intended to put a weight in the focus detection ability at the center of the field. The off-axis focus detection areas b–e are arranged similarly to those of the embodiment of FIG. 2.

Figure 4:
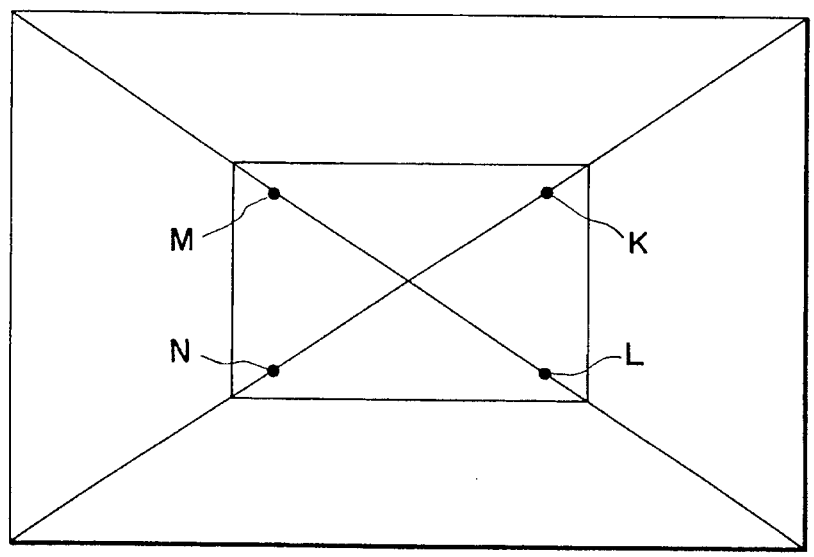
FIG. 4 shows an arrangement of focus detection areas.
Figure 5:
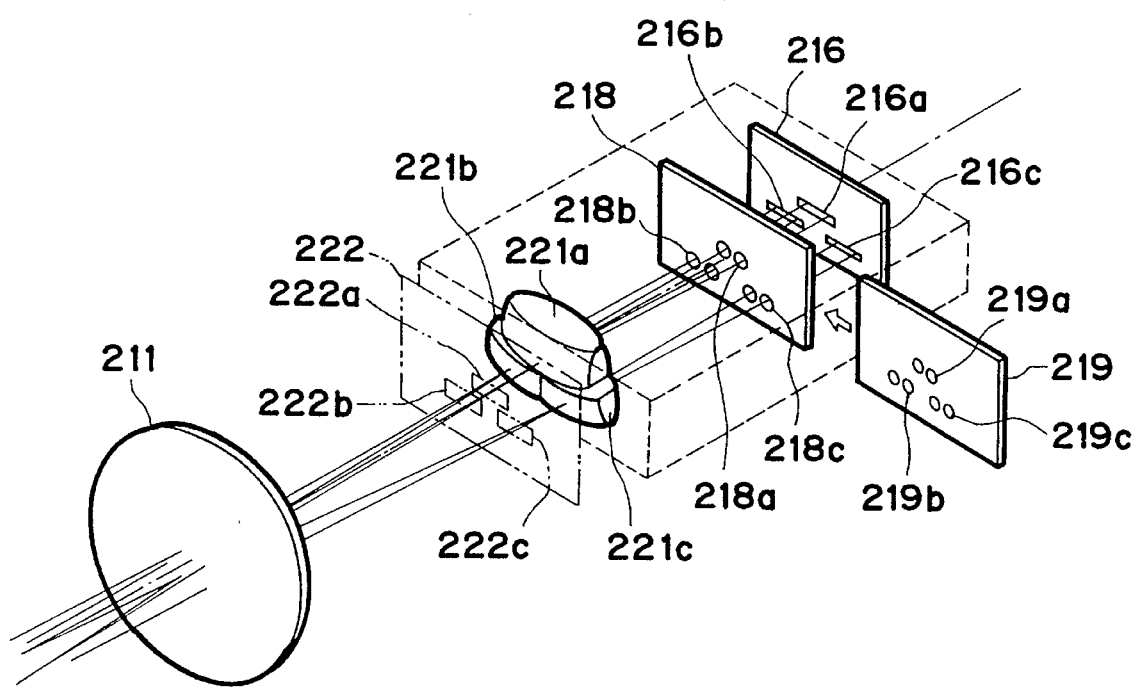
FIG. 5 shows a perspective view of a construction of a prior art focus detection device.
Figure 6A:
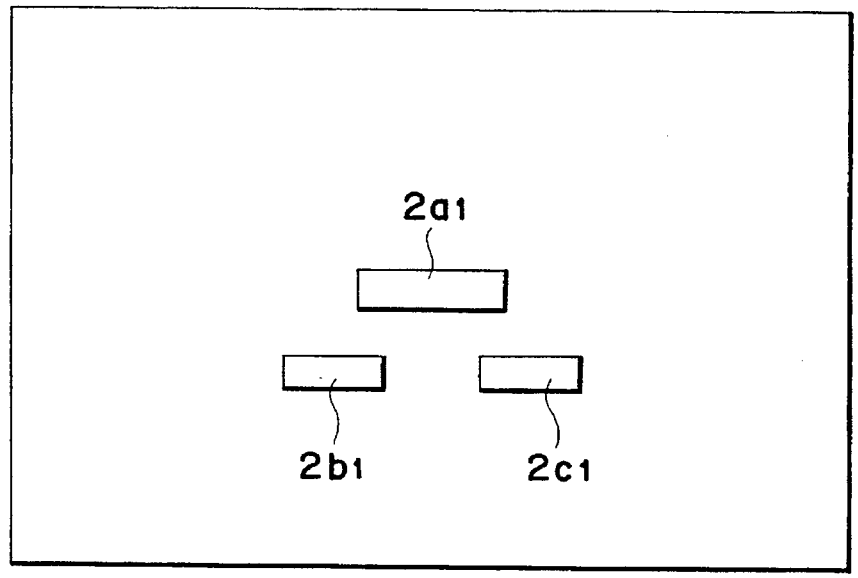
FIGS. 6A and 6B show focus detection areas in the prior art.
Figure 6B:
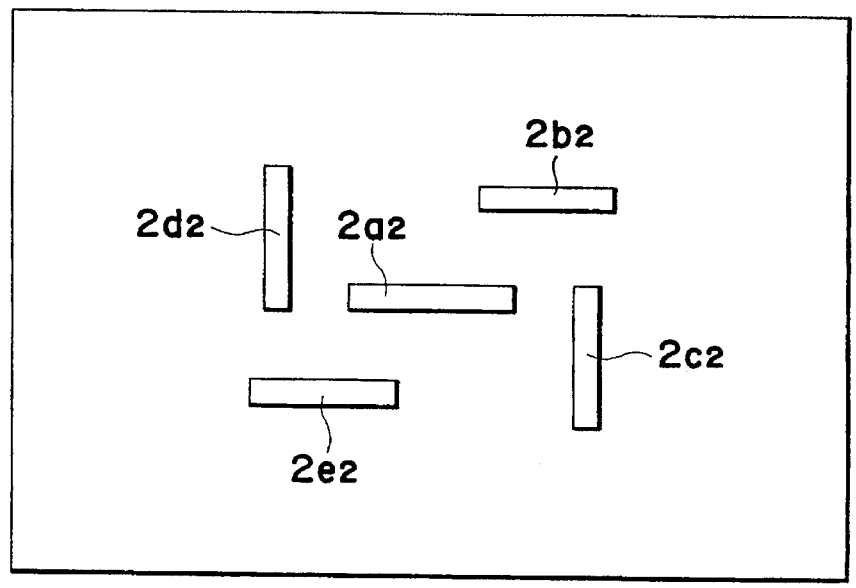

FIG. 4 shows focus detection areas on the photographing field in a second embodiment of the present invention. In the focus detection of a video camera, the focus detection areas are arranged in a rectangle to include all of the four points which divide the crossing diagonal lines of the photographing field into three parts. With this arrangement, the in-focusing is attained even if the object moves, and it is effective in the focus detection of the video camera.

In accordance with the present invention, since the photo-electric conversion device arrays are arranged generally vertically, the distance between the two points on the diagonal lines is shorter than that in the horizontal arrangement. Thus, when two pairs of photo-electric conversion device arrays are to be covered by one refocusing optical system, the effect of the lens aberration is less. Since the two focus detection areas may be focus-detected by one refocusing optical system, the cost is reduced and the adjustment time of the optical system is shortened.

Further, since photo-electric conversion device arrays are arranged on the opposite sides of the horizontal center line of the photographing field (which passes through the optical axis), when the camera is oriented so that the length of the rectangular field is horizontal, the processing time for the arithmetic operation can be reduced without unduly increasing the number of pixels of the photo-electric conversion device arrays to be used for the focus detection, and the focus detection in the area which is not important for the composition can be eliminated.

In accordance with another aspect of the present invention, since the focus detection areas are arranged at the positions which divide the pair of diagonal lines of the photographing field into three parts, the possibility of in-focusing in the photographing with a common composition, that is, in the common photographing, is enhanced.

With the present area arrangement, the arrangement of the focus detection areas is symmetric with respect to the optical axis in the horizontal, composition as well as the vertical composition so that stable focus detection is attained and the focus detection with the same arrangement is attained when the camera is oriented with the right side down or with the left side down.

What is claimed is:

1. A focus detection device for a camera capable of detecting focuses at a plurality of areas on a photographing field, comprising:

two pairs of photo-electric conversion device arrays arranged on one substrate in optical correspondence to two of said plurality of areas;

said two areas being arranged on a line extending generally vertically to a center axis crossing an optical axis on said photographing field, on opposite sides of said center line; and a refocusing optical system for refocusing light beams passing through different points of an exit pupil of a photographing lens, onto said two pairs of photo-electric conversion device arrays;

said refocusing optical system including one pair of refocusing lenses for refocusing light beams onto both of said two pairs of photo-electric conversion device arrays.

2. A focus detection device for a camera according to claim 1, further comprising another two pairs of photo-electric conversion device arrays and another pair of refocusing lenses for refocusing light beams onto both of said other two pairs of photo-electric conversion device arrays, wherein the four pairs of photo-electric conversion device arrays are arranged in the vicinities of four points dividing each of crossing diagonal lines of the photographing field into three equal parts.

3. A focus detection device of a camera according to claim 1 wherein the photographing field is rectangular and the center line crossing the optical axis on the photographing field is a horizontal line with the camera oriented so that the length of the photographing field is horizontal.

4. A focus detection device for a camera according to claim 1 wherein said photo-electric conversion device arrays are one dimensional photo-electric conversion device arrays.

5. A focus detection device for a camera according to claim 1 wherein said two areas are arranged on a line offset horizontally from said optical axis.

6. In a focus detection device for a camera including a photo-electric conversion device array to detect focusing states at a plurality of areas in a photographing field having a horizontal center line crossing an optical axis, the improvement wherein two of said plurality of areas are elongated along a length of each and are arranged with the length on a perpendicular line offset from the optical axis along the horizontal center line and extending substantially perpendicularly to the horizontal center line.

7. A focus detection device for a camera according to claim 6, wherein four areas including two more areas are arranged in the vicinities of four points dividing each of crossing diagonal lines of the photographing field into three equal parts.

8. A focus detection device for a camera according to claim 6, wherein another of said plurality of areas is an area including a central point of the photographing field.

9. A focus detection device for a camera capable of detecting focusing states at a plurality of areas on a photographing field, comprising:

two pairs of photo-electric conversion device arrays arranged on one substrate and optically corresponding to two of said plurality of areas, respectively, the photo-electric conversion device arrays of each pair being arranged alternately with the photo-electric conversion device arrays of the other pair on a single line, and said two areas being arranged on a line that is offset from an optical axis of the photographing field and that is substantially perpendicular to a center line of the photographing field crossing the optical axis; and a refocusing optical system for refocusing light beams passing through different portions of an exit pupil of a photographing lens onto said two pairs of photo-electric conversion device arrays, said refocusing optical system including one pair of refocusing lenses for refocusing light beams onto both of said two pairs of photo-electric conversion device arrays.

10. A focus detection device for a camera according to claim 9 further comprising another two pairs of photo-electric conversion device arrays and another pair of refocusing lenses for refocusing light beams onto both of said another two pairs of photo-electric conversion device arrays, wherein the four pairs of photo-electric conversion device arrays are arranged in the vicinities of four points dividing each of crossing diagonal lines of the photographing field into three equal parts.

11. A focus detection device of a camera according to claim 9 wherein the photographing field is rectangular and the center line crossing the optical axis on the photographing field is a horizontal line with the camera oriented so that the length of the photographing field is horizontal.

12. A focus detection device for a camera according to claim 9 wherein said photo-electric conversion device arrays are one dimensional photo-electric conversion device arrays.

13. A focus detection device for a camera according to claim 9 wherein said two areas are arranged on a line offset horizontally from said optical axis.

* * * * *

UNITED STATES PATENT AND TRADEMARK OFFICE
CERTIFICATE OF CORRECTION

PATENT NO. : 5,612,762
DATED : March 18, 1997
INVENTOR(S) : Ohsawa

It is certified that error appears in the above-indentified patent and that said Letters Patent is hereby corrected as shown below:

Cover Page, [57], Abstract, line 7, "axis" should be --line--; "line" should be --axis--.

Col. 4, claim 1, line 48, "axis" (first occurrence) should be --line--.

Signed and Sealed this

Fifteenth Day of July, 1997

Attest:

BRUCE LEHMAN

Attesting Officer

Commissioner of Patents and Trademarks